United States Patent
Alpha et al.

(10) Patent No.: US 6,980,976 B2
(45) Date of Patent: Dec. 27, 2005

(54) COMBINED DATABASE INDEX OF UNSTRUCTURED AND STRUCTURED COLUMNS

(75) Inventors: Shamim A. Alpha, Foster City, CA (US); Garrett Kaminaga, Redwood Shores, CA (US); Paul Dixon, Redwood City, CA (US)

(73) Assignee: Oracle International Corp., Redwood Shores, CA (US)

( * ) Notice: Subject to any disclaimer, the term of this patent is extended or adjusted under 35 U.S.C. 154(b) by 372 days.

(21) Appl. No.: 09/928,894

(22) Filed: Aug. 13, 2001

(65) Prior Publication Data

US 2003/0033275 A1 Feb. 13, 2003

(51) Int. Cl.[7] ................................................ G06F 17/30
(52) U.S. Cl. ........................ 707/1; 707/3; 707/100; 707/102
(58) Field of Search .................... 707/1–5, 100, 707/104.1, 102, 200; 713/177

(56) References Cited

U.S. PATENT DOCUMENTS

| | | | | |
|---|---|---|---|---|
| 5,557,791 A | * | 9/1996 | Cheng et al. | 707/2 |
| 5,644,763 A | * | 7/1997 | Roy | 707/101 |
| 6,169,983 B1 | * | 1/2001 | Chaudhuri et al. | 707/2 |
| 6,223,171 B1 | * | 4/2001 | Chaudhuri et al. | 707/2 |
| 6,243,713 B1 | * | 6/2001 | Nelson et al. | 707/104.1 |
| 6,272,487 B1 | * | 8/2001 | Beavin et al. | 707/2 |
| 6,349,308 B1 | * | 2/2002 | Whang et al. | 707/103 Z |
| 6,427,123 B1 | * | 7/2002 | Sedlar | 702/2 |

* cited by examiner

Primary Examiner—Greta Robinson
Assistant Examiner—Cheryl Lewis
(74) Attorney, Agent, or Firm—McDonald Hopkins Co. LPA

(57) ABSTRACT

A database management system and method provides access to a data table having structured data and unstructured data. A user interface allows a user to issue instructions to the database management system such as to build an index based on the structured and unstructured data and to search the data table. An indexing logic generates an index structure by combining the structured and unstructured data. With this index structure, a single query can contain search conditions from both the structured data and the unstructured data. In this manner, efficiency for searching the data table for combined structured and unstructured conditions is improved.

24 Claims, 4 Drawing Sheets

COMBINED DATABASE INDEX OF UNSTRUCTURED AND STRUCTURED COLUMNS

FIELD OF THE INVENTION

The invention relates to the database management arts. It finds particular application to a method and system of providing a combined database index of unstructured and structured columns. It will be appreciated that the present invention will find application to unstructured data types such as text, images, audio and video in combination with structured data or other unstructured data types to provide improved indexing capabilities.

BACKGROUND OF THE INVENTION

In typical database systems, users store, update, and retrieve information by interacting with user applications ("clients"). The clients respond to the user's interaction by submitting commands to a database application (a database management system/a "database server") responsible for maintaining the database. The database server responds to the commands by performing the specified actions on the database. To be correctly processed, the commands must comply with the database language that is supported by the database server. One popular database language is known as Structured Query Language (SQL).

One common configuration of a database is one made up of various tables with each table being formed of rows and columns of information. The information stored across one row in the table would make up one record and the fields of the record would be columns in the table. In other words, the table would contain rows of individual records and columns of record fields. Because one record may contain more than one field of information, the information of the field would make up the columns of the database table. Other database configurations are known in the art. Database management programs support multiple users thereby enabling each user to access the same table concurrently.

An index is commonly used by database management programs to provide quick and efficient associative access to a table's records. These indexes are commonly configured in a B-Tree structure which includes a root node with many levels of nodes branching from the root node. The information contained in these nodes may include pointers which point to the nodes at the next level of the tree or it may include pointers which point to one or more records stored in the database. These pointers include additional key record information which may reference the records stored in the database. The record keys are stored in an ordered form throughout the nodes at the various branches of the tree. For example, an index tree may exist for an alphabetic listing of employee names.

Various access methods may be used to retrieve data from a database. The access methods used to retrieve data may significantly affect the speed of the retrieval and the amount of resources consumed during the retrieval process. Many access methods use indices to increase the speed of the data retrieval process. Typical database management systems have built-in support for a few standard types of access methods, such as access methods that use B+Trees and Hash Tables, that may be used when the key values belong to standard sets of data types, such as numbers, strings, etc. This type of data is referred to as structured data.

In recent years, databases are being used to store different types of data, such as text, spatial, image, video, and audio data. For many of these complex data types, the standard indexing techniques and access methods cannot readily be applied. Text data or image data cannot be readily used in a B-tree index because B-tree's are based on equality conditions that can be computed against a "value." Text data, such as a sentence, does not have a "value" that can be used in a B-tree that is being searched for individual words. This type of data is referred to as unstructured data as opposed to structured data. Unstructured data can be searched efficiently by using an inverted index such as Oracle text.

Thus, queries that include conditions for both unstructured data and structured data have not been efficiently processed. The results of both conditions would be combined based on the query operator and a final set of matched records was obtained.

The present invention provides a method and system for generating a database index that cures the above-referenced problems and others.

SUMMARY OF THE INVENTION

According to one embodiment of the present invention, a method of generating an index to provide access to a database where the database includes structured data columns and unstructured data columns is provided. The method includes identifying an unstructured data column and a structured data column from the database. A combined index of the unstructured data column and the structured data column is generated where the combined index provides associative access to the database using a query that includes both unstructured conditions and structured conditions.

According to another embodiment of the present invention, a database management system is provided that accesses a data table. The system comprises a user interface that receives instructions from a user. An indexing logic generates an index structure by combining an unstructured data column and a structured data column from the data table. The index structure allows data retrieval from the data table based on a query received from the user interface having conditions associated to both the unstructured data column and the structured data column.

According to a more limited aspect of the present invention, the index structure is a B-tree including branches for data from the unstructured data column and branches for data from the structured data column.

According to another aspect of the present invention, a method of searching a data table having at least a column of structured data and a column of unstructured data is provided. The method includes converting the unstructured data into a structured-like form. An index structure is then generated based on the converted unstructured data and the structured data. The data table is then searchable using the index structure in response to a query having conditions from both the unstructured data and the structured data.

Even more generally, a combined index can be produced on multiple unstructured columns by converting all of them into structured-like form.

One advantage of the present invention is that data retrieval for queries having combined structured and unstructured conditions are improved. Additionally, the amount of data fetched to determine relevant rows is reduced. As a result, memory used for caching is utilized better.

Another advantage of the present invention is that response time for such queries is reduced.

Still further advantages of the present invention will become apparent to those of ordinary skill in the art upon reading and understanding the following detailed description of the preferred embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF ILLUSTRATED EMBODIMENT

The following includes definitions of exemplary terms used throughout the disclosure. Both singular and plural forms of all terms fall within each meaning:

"Software", as used herein, includes but is not limited to one or more computer executable instructions, routines, algorithms, modules or programs including separate applications or from dynamically linked libraries for performing functions as described herein. Software may also be implemented in various forms such as a servlet, applet, stand-alone, plug-in or other type of application.

"Logic", as used herein, includes but is not limited to hardware, software and/or combinations of both to perform a function.

"Network", as used herein, includes but is not limited to the internet, intranets, Wide Area Networks (WANs), Local Area Networks (LANs), and transducer links such as those using Modulator-Demodulators (modems). "Internet", as used herein, includes a wide area data communications network, typically accessible by any user having appropriate software. "Intranet", as used herein, includes a data communications network similar to an internet but typically having access restricted to a specific group of individuals, organizations, or computers.

Figure 1:
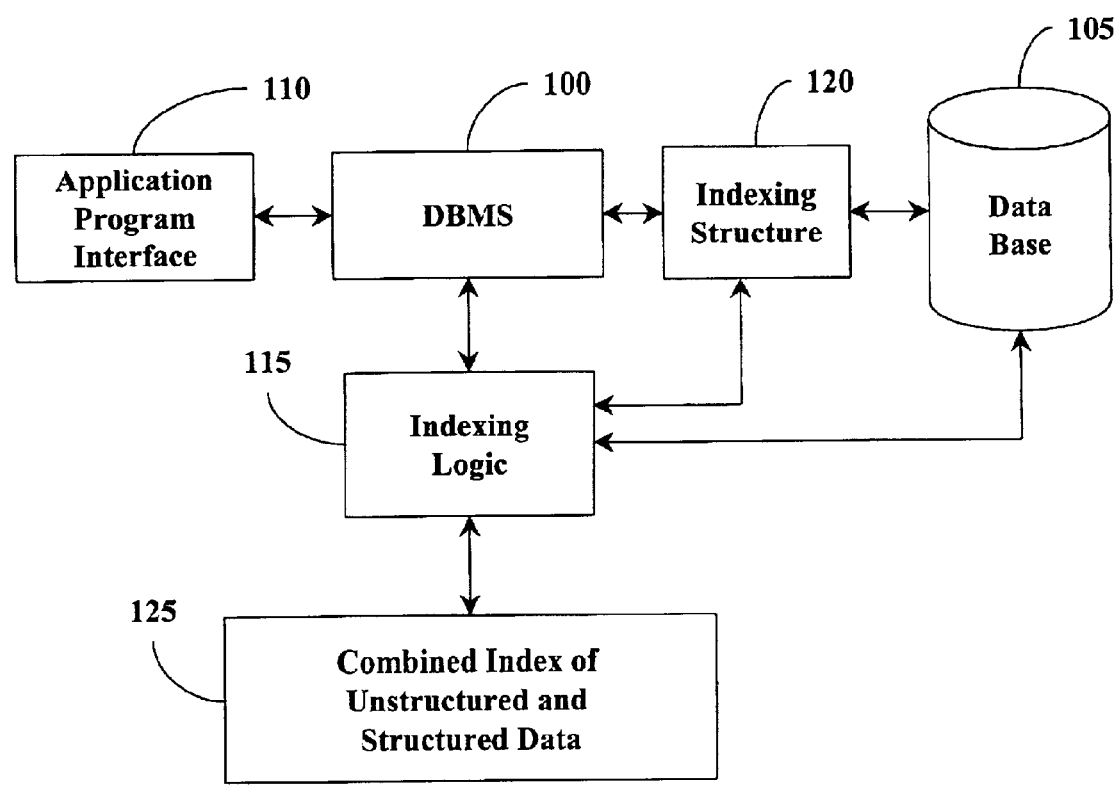
FIG. 1 is an exemplary overall system diagram in accordance with the present invention.

Illustrated in FIG. 1 is an exemplary overall system diagram in accordance with the present invention. A database management system (DBMS) 100 includes a complex set of software programs that control the organization, storage and retrieval of data in a database 105 which may store data as fields, records, files, tables etc. It also controls the security and integrity of the database. An application program interface 110 includes one or more software programs that allow users to communicate with the DBMS 100 to perform tasks such as manipulate the database, store and retrieve data, request data in the form of search queries, etc. as is known in the art. Query languages and report writers are common means to allow users to interactively interrogate the database 105 and analyze its data. The Structured Query Language, also known as SQL, is a well known query language.

The DBMS 100 is operated on a computer system that executes software and processes information as is known in the art. The computer system generally may take many forms, from a configuration including a variety of processing units, networked together to function as a integral entity, to a single computer, e.g., a personal computer, operational in a stand-alone environment. The present invention can be embodied in any of these computer system configurations. As known in the art, computer systems may include a variety of components and devices such as a processor, memory, data storage, data communications buses, and a network communications device.

The database 105 can be organize in many configurations. Three common organizations are the hierarchical database, network database and relational database. The DBMS may provide one, two or all three organizations. The most suitable structure depends on the application and on the transaction rate and the number of inquiries that will be made. For exemplary purposes, the present invention will be described with reference to a relational database management system (RDBMS).

A relational database allows the definition of data structures, storage and retrieval operations and integrity constraints. In such a database, the data and relations between them are organized in tables. A table is a collection of records and each record in a table contains the same fields. Certain fields may be designated as "keys", which means that searches for specific values of that field can be performed using indexing to increase response time.

In that regard, an indexing logic 115 is provided to create one or more indexing structures 120 that make data search and retrieval from the database more efficient. The index structure, or index, provides an associative access to the database 105 based on selected data fields from the database that are frequently used as search terms. The selected data fields act as keys in the index so that the location of their associated records in the database are quickly found. In a relational database, the indexing structure 120 resides inside the database.

The indexing logic 115 includes logic for generating a combined index 125 of unstructured data and structured data from the database 105. Although there is not a concrete definition of what is structured and unstructured data, whether data is structured or unstructured depends on the type of search being performed on it. For example, data that is searched with equality conditions such as =, <, >, etc. is structured. This data typically includes numeric values and/or simple text, for example, Age<45, Name=John. Results from a structured search can be said to be definite. On the other hand, queries that search some derived attribute from the content of the data are unstructured. For example, data that is searched with Boolean operators such as AND, NOT, OR, etc. is unstructured. This data includes, for example, text, images, video, and/or audio, for example ("cheap" AND "golf clubs"), ("dog" NOT "brown"). Results from an unstructured search may be debatable since they may not be what the user was looking for.

In one embodiment, the combined index 125 is a B-tree index formed from both the unstructured data and the structured data. For example, a first level of branching can be based on the unstructured data and a second level of branching can be based on its associated structured data values. With the combined index 125, a single query can contain both structured and unstructured conditions such as a search involving data fields from a text description (DESC) and a price value (PRICE). For example, the search may request records that match DESC having "cheap" AND "clubs"; AND PRICE<10.

Figure 2:
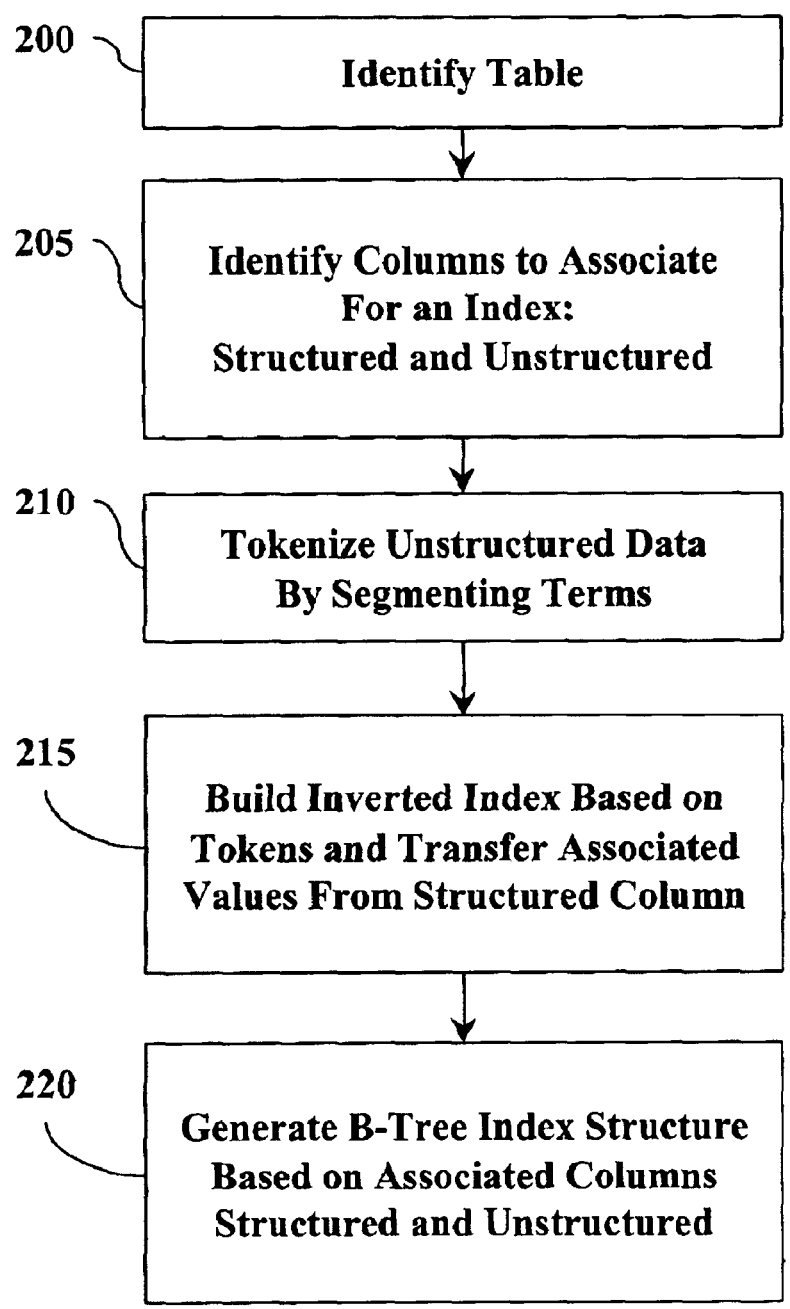
FIG. 2 is an exemplary methodology of generating a combined index of unstructured and structured data in accordance with the present invention.

Illustrated in FIG. 2 is an exemplary computer-implemented methodology of generating the combined index 125 by the indexing logic 115 in accordance with the present invention. The blocks shown represent functions, actions or events performed therein. It will be appreciated that computer software applications involve dynamic and flexible processes such that the illustrated blocks can be performed in other sequences different than the one shown. It will also be appreciated by one of ordinary skill in the art that the software of the present invention may be implemented using various programming approaches such as procedural, object oriented or artificial intelligence techniques.

With reference to FIG. 2, database indexes are created when certain data fields are frequently searched. Using the application program interface 110, commands are issued to the DBMS instructing it to create an index for an identified data table (block 200). Also identified are the columns (unstructured data and structured data) from the data table that will be associated to form the index (block 205). The unstructured data is then tokenized by segmenting it into individual units or terms (block 210). For example, if the unstructured data includes a textual description having a plurality of words, the description is parsed and segmented into individual words which act as tokens. Trivial words such as prepositions can be eliminated if desired. By tokenizing, the unstructured data is converted to a structured-like form (e.g. simple text that can be searched with equality operators). Also included for each record is locator data, such as Row IDs or addresses, that identify all the records in the original data table that include the token of the record as is known in the art.

With further reference to FIG. 2, an inverted index table is built based on the tokens where each token is stored in separate records, the token being a "key" field (block 415). The structured data values from the original data table are then transferred to the inverted index table into the records corresponding to their original association with the unstructured data column. A B-tree index structure is then generated from the inverted index table based on the associated columns (e.g. the Token column and the structured data column). For example, the token can be a first level of branching and values from the structured data column can be a second level of branching, leading to leaf nodes. This will be further described below.

Figure 3:
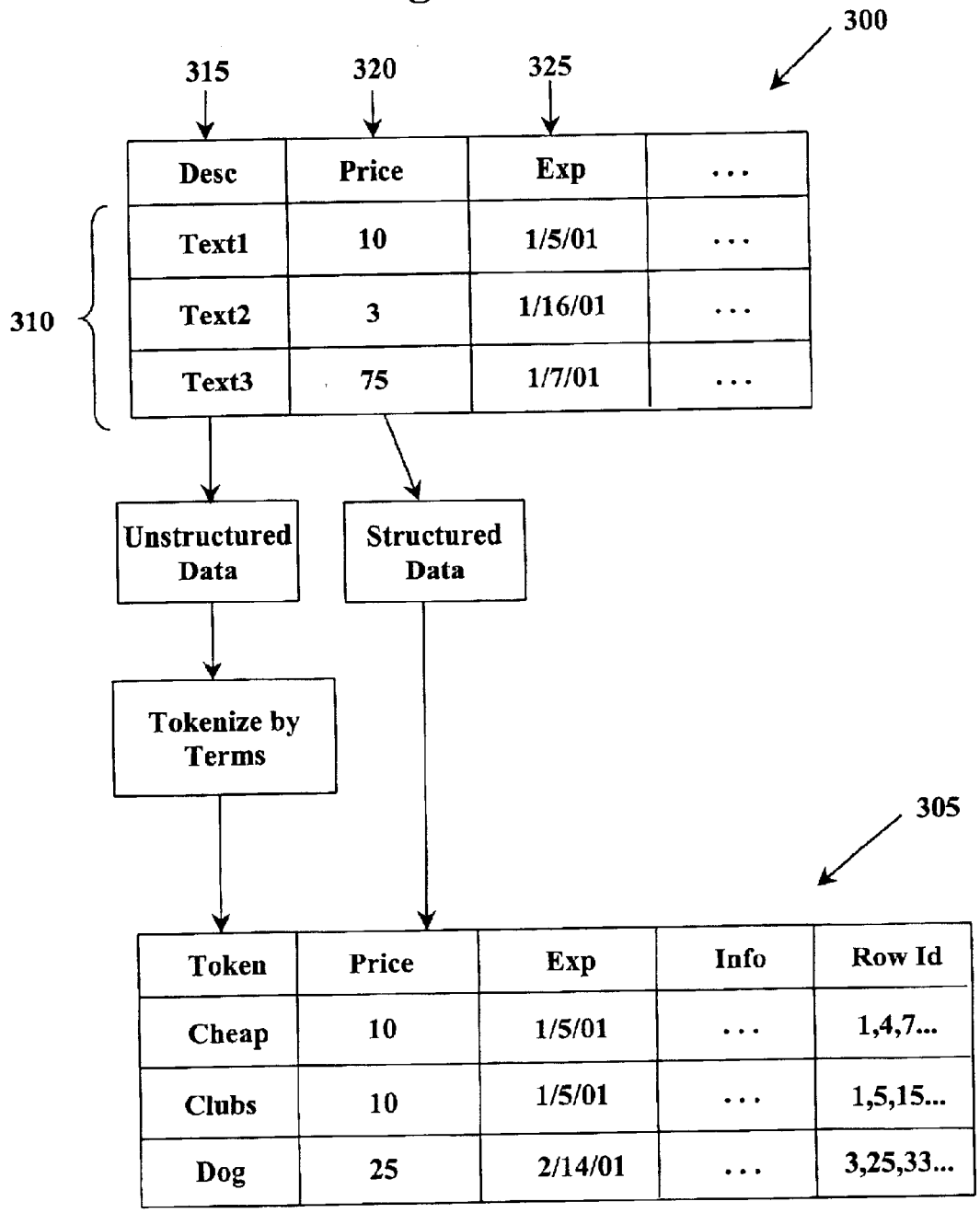
FIG. 3 illustrates an exemplary inverted index table generated from an exemplary data table in accordance with the present invention.

Illustrated in FIG. 3 is a graphical representation of an exemplary data table 300 and an inverted index table 305 generated based on unstructured and structured columns from the data table 300. For exemplary purposes, suppose the data table contains records or documents representing items for sale in an auction and the table is accordingly named, "Auction." The Auction table includes exemplary rows 310 each representing a record for each item. Each row has one or more data fields describing the item including a "Description," "Price," "Expiration date" of the sale etc. The data fields are contained in columns such as columns 315 (Description), 320 (Price), 325 (Expiration date), etc.

With further reference to FIG. 3, suppose the Description column is unstructured data and includes free-form Text description of the item for sale. For example "Text1" may include "For sale. Cheap golf clubs including woods and irons. Two years old." Further suppose that the "Price" column is structured data having price values (e.g. 10, 3, 75, . . . ) for each item. Having predetermined that an index is desired for both the "Description" and "Price" columns, the text from the "Description" column is tokenized into individual terms and the inverted index table 305 is generated based on the tokens. For example, each token word in the "Description" column becomes a record in the inverted index table. Furthermore, each record includes its corresponding structured data value (Price) transferred from the Auction table 300. Other fields may also be transferred for further indexing. Each record also includes a "Row ID" field that identifies all the records from the Auction table that contain the token word such that they are quickly found during a search for that token. Other information fields (e.g. "info") may also be included in a record that identify, for example, multiple occurrences of the token, the frequency of the token, or other information.

The inverted index table 305 is shown in FIG. 3 with only a few random tokens and records. For example, from the "Text1" Description above, the words "Cheap" and "Clubs" were extracted and stored as Tokens with their associated "Price" of 10 and "Expiration Date" of Jan. 5, 2001. The "Row ID" lists all records from the Auction Table that contain those tokens. Therefore, rather than searching all records in the Auction table for a selected word, the word is associated to a list of records that contain the word. Hence the name "inverted index." This data structure increases the searching speed for text in the "Description" column. Now, the system creates another data structure, e.g. a B-tree index, that will increase the searching speed for text and another value, in this case, Price. Once the inverted index table is built, a B-tree index is generated from the columns identified to be the combined index, namely, Token and Price.

Figure 4:
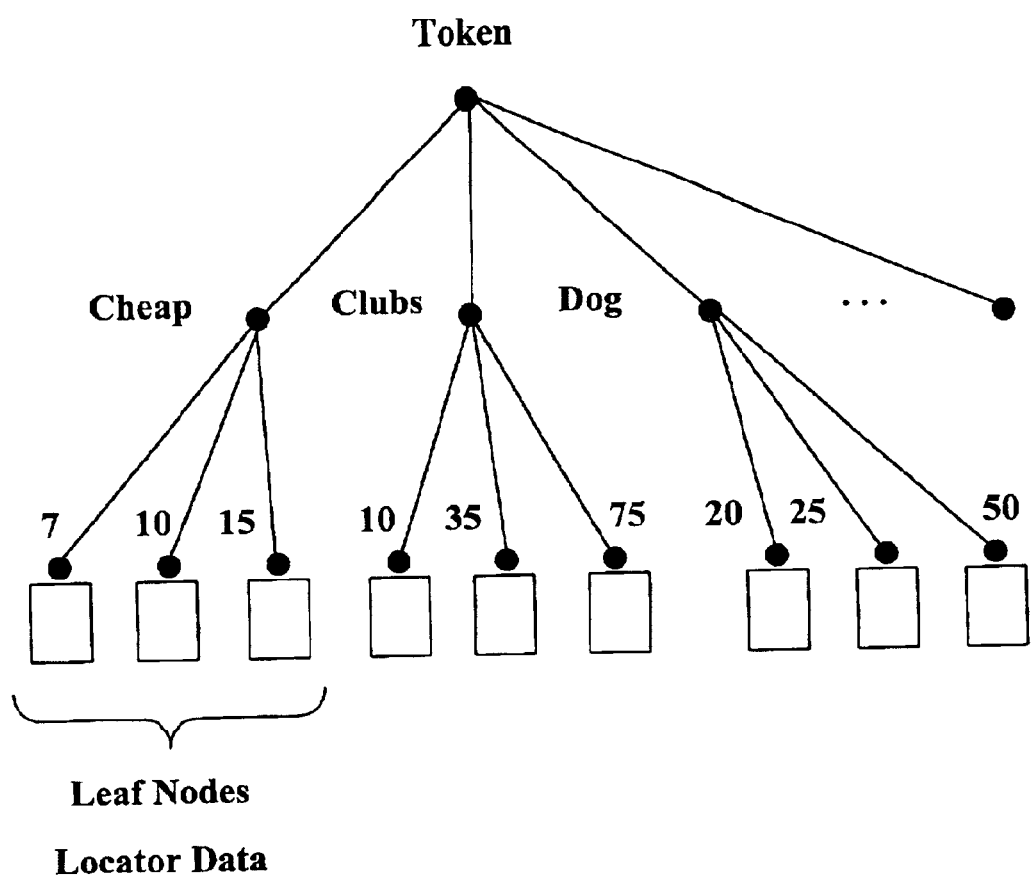
FIG. 4 is an exemplary B-tree index built from the inverted index table of FIG. 3.

Illustrated in FIG. 4 is an exemplary B-tree index structure generated from the invented index table 305. Nodes are represented as circles and, based on desired configurations, may contain tree branching information such as pointers or addresses to and from child nodes, parent nodes, and/or sibling nodes (e.g. nodes at the same branching level). Overall, the B-tree is a precomputed list of possible combinations of Token and Price based on the inverted index table. In the B-tree shown, the Token from the unstructured data forms a first level of branching and the Price values form a second level of branching. At the ends of the tree are leaf nodes that contain locator data such as the "Row IDs" of all the records from the original Auction table that match the conditions of the nodes leading to that leaf node. For example, the left-most leaf node would contain locator information of all records that contain "Cheap" in the Description column and "7" in the Price column.

Once the B-tree is generated, the combined index is ready for use by a user and/or the DBMS 100. With this index structure, a query can request the system to retrieve all records that match both unstructured conditions and structured conditions. For example, to find all records that match Description conditions of "Cheap" AND "Clubs" and a Price condition of Price<15, the B-tree would be traversed to leaf nodes looking for records that satisfy "Cheap" and "Price<15". A first answer set is retrieved. Then the B-tree is traversed to leaf nodes looking for records that satisfy "Clubs" and "Price<15" and a second answer set is retrieved. Then, since the "AND" operator was used between "Cheap" and "Clubs", an intersection of the answer sets are found leaving only the records that match the original query.

The following is an example of creating a combined index from unstructured and structured data and requesting a query based on programming syntax for an Oracle database. It will be appreciated that many other programming languages can be used with the present invention as well as other programming syntax, operator names, and sequences.

Indexing Example

Consider a table called AUCTION with the following schema:

```
create table auction(
item_id number,
title varchar2(100),
category_id number,
price number,
bid_close date);
```

Assume that queries on the table involve a text query clause and optional structured conditions on category_id. Results will be sorted based on either bid_close, category_id, or price. This type of index is referred to as a catalog index and is created to support the different types of structured queries a user might enter. To create the indexes, first create an index set preference then add the required indexes to it.

The following example creates the index set preference and adds two different indexes to it:

```
begin
ctx_ddl.create_index_set('auction_iset');
ctx_ddl.add_index('auction_iset', 'bid_close'); /*index A*/
ctx_ddl.add_index('auction_iset', 'category_id, bid_close'); /*index B*/ end;
```

Create a combined catalog index with a CREATE INDEX command as follows:

create index auction_titlex on AUCTION(title) indextype is CTXCAT parameters ('index set auction_iset');

Querying Example

To query the title column for the word "camera", a user can issue regular and mixed queries using a "CATSEARCH" operator using the previously defined combined index as follows:

select from AUCTION where CATSEARCH(title, 'camera', NULL)>0;

The following query uses index A:

select from AUCTION where CATSEARCH(title, 'camera', 'bid_close=20-FEB-2000')>0;

The following query uses index B:

select from AUCTION where CATSEARCH(title, 'camera', 'category_id=99 order by bid_close desc')>0;

Use the CATSEARCH operator to search catalog indexes. Use this operator in the WHERE clause of a SELECT statement.

Exemplary Syntax:

CATSEARCH(
[schema.]column,
text_query VARCHAR2,
structured_query VARCHAR2,
RETURN NUMBER;

In "[schema.]column," specify the text column to be searched on. This column would have a CTXCAT index associated with it. In "text query," specify the query expression that defines the search in "column" that includes unstructured data. The CATSEARCH operator supports the following query operations: Logical AND, Logical OR (|), Logical NOT (−), " " (exact phrases quoted).

In "structured_query," specify the structured conditions and the ORDER BY clause. There should be an index for any column specified. For example, if you specify 'category_id=1 order by bid_close', there should be an index for 'category_id, bid_close' as specified with CTX_DDL.ADD_INDEX.

With "structured_query," you can use standard SQL syntax with the following operators =,<=, >=, >, <, IN, BETWEEN.

An exemplary query with CATSEARCH using the combined index might include a structured clause as follows to find all rows that contain the word camera with id of 99 ordered by bid_close:

select from AUCTION where CATSEARCH(title, 'camera', 'category_id=99 order by bid_close desc')>0

The following query finds all rows with the exact phrase XYZ CD Player:

select from AUCTION where CATSEARCH(title, '"XYZ CD Player"', 'order by bid_close desc')>0

The following query finds all rows with the terms XYZ and CD and Player:

select from AUCTION where CATSEARCH(title, 'XYZ CD Player', 'order by bid_close desc')>0

The following query finds all rows with the term CD-Player:

select from AUCTION where CATSEARCH(title, 'CD-Player', 'order by bid_close desc')>0

The following query finds all rows with the term CD and not Player:

select from AUCTION where CATSEARCH(title, 'CD-Player', 'order by bid_close desc')>0

The following query finds all rows with the terms CD or DVD or Speaker:

select from AUCTION where CATSEARCH(title, 'CD|DVD|Speaker', 'order by bid_close desc')>0

In another embodiment, the unstructured data can include image data, video data and/or audio data. In this regard, a signature is generated that represents characteristic properties of the data. For example, for an image, its signature may include representations of its color, texture, shades, and/or other image properties. The signature can then be tokenized similar to the text data described above and a B-tree can be generated. To find matches, a vector match can be performed to compare two signatures of two images or videos. In this manner, other combined indexes can be generated such as text and video, text and image, image and values, etc.

With the present invention queries having unstructured and structured data conditions can be more efficiently processed. Tokenizing unstructured data converts it to a structured form thus making it usable in index structures. To that extent, combined indexes can also be made between multiple unstructured columns.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, the index structure generated can be other types of tree structures rather than a B-tree, or may be a hashing function or other type of indexing form as known in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A computer implemented method of generating an index to provide access to a database where the database includes structured data columns and unstructured data columns, the method comprising the steps of:

identifying one or more unstructured data columns and one or more structured data columns from the database;

generating a combined index of the unstructured and structured data columns, the combined index providing associative access to the database using a query that includes both unstructured conditions and structured conditions.

2. The method as set forth in claim 1 further including generating an inverted index table based on the unstructured data column.

3. The method as set forth in claim 2 further including tokenizing the unstructured data column into tokens where the inverted index table is generated based on the tokens, the tokens being data from the unstructured data column.

4. The method as set forth in claim 3 further including generating a B-tree from the inverted index table to form the combined index, where a first level of branching is based on the tokens and a second level of branching is based on values from the structured data column.

5. The method as set forth in claim 3 wherein the unstructured data column includes text, and where the tokenizing includes parsing the text into individual words that become the tokens.

6. The method as set forth in claim 2 further including adding the structured data column to the inverted index.

7. The method as set forth in claim 1 wherein the unstructured data column includes text.

8. The method as set forth in claim 1 wherein the unstructured data column includes data being one of image data, video data, and audio data.

9. The method as set forth in claim 8 further including:
   generating a signature for each of the data of the unstructured data column;
   generating an inverted index table based on the signature for each of the data and the structured data column associated with each signature; and
   generating a tree index of the inverted index table to form the combined index.

10. A database management system for providing access to a data table, the system comprising:
    a user interface for receiving instructions from a user; and
    indexing logic that generates an index structure by combining an unstructured data column and a structured data column from the data table, the index structure allowing data retrieval from the data table based on a query received from the user interface having conditions associated to both the unstructured data column and the structured data column.

11. The database management system as set forth in claim 10 wherein the index structure is a B-tree including branches for data from the unstructured data column and branches for data from the structured data column.

12. The database management system as set forth in claim 10 wherein the unstructured data column includes rows having text data including one or more words, and the structured data column includes corresponding rows having a value.

13. The database management system as set forth in claim 12 wherein the indexing logic further includes:
    segmenting logic for segmenting the text data from each of the rows of the unstructured data column into words; and
    logic for building an inverted index table from the data table based on the words from the unstructured data column and corresponding values from the structured data column.

14. The database management system as set forth in claim 13 wherein the index structure is a B-tree generated from the inverted index table where the B-tree forms an index structure of the words from the unstructured data column and the corresponding values from the structured data column.

15. The database management system as set forth in claim 10 wherein the unstructured data column includes rows having one of image data, video data and audio data represented by a signature having searchable characteristics.

16. A computer implemented method of searching a data table having at least a column of structured data and a column of unstructured data, the method comprising the steps of:
    converting the unstructured data into a structured-like form;
    generating an index structure based on the converted unstructured data and the structured data; and
    searching the data table using the index structure in response to a query having conditions from both the unstructured data and the structured data.

17. The method as set forth in claim 16 wherein the unstructured data includes text data, and the converting includes tokenizing the text data into words.

18. The method as set forth in claim 17 wherein the generating includes building an inverted index table for the data table, the inverted index having the words of the text data as one data column and having values from the structured data as another data column.

19. The method as set forth in claim 18 wherein the index structure is generated as a B-tree from the inverted index table having the words as branching conditions and having the values from the structured data as sub-branching conditions associated with the words.

20. The method as set forth in claim 16 wherein the index structure is an indexing tree having the converted unstructured data as branching conditions and having the structured data as branching conditions.

21. The method as set forth in claim 16 wherein the structured data is an unstructured data converted to a structured form.

22. A computer-readable medium for providing computer executable instructions configured to perform the method of claim 16.

23. A computer-readable medium for providing computer executable instructions configured to perform the method of claim 1.

24. A computer-readable medium for providing computer executable instructions that when executed cause a computer to perform a method, the method comprising:
    receiving instructions from a user; and
    generating an index structure in response to the instructions by combining an unstructured data column and a structured data column from a data table, the index structure allowing data retrieval from the data table based on a query received from the user having conditions associated to both the unstructured data column and the structured data column.

* * * * *

UNITED STATES PATENT AND TRADEMARK OFFICE
CERTIFICATE OF CORRECTION

PATENT NO.     : 6,980,976 B2
DATED          : December 27, 2005
INVENTOR(S)    : Alpha et al.

It is certified that error appears in the above-identified patent and that said Letters Patent is hereby corrected as shown below:

Column 4,
Line 3, "a" should read -- an --.

Column 5,
Line 35, "block 415" should read -- block 215 --.

Column 6,
Line 31, "invented" should read -- inverted --.

Signed and Sealed this

Eighteenth Day of April, 2006

JON W. DUDAS
*Director of the United States Patent and Trademark Office*